United States Patent [19]

Asada et al.

[11] 4,395,817
[45] Aug. 2, 1983

[54] METHOD OF MAKING KEYBOARD SWITCHES

[75] Inventors: Takafumi Asada; Kazuyoshi Shinohara, both of Hirakata; Kanji Kiyohara, Yao; Tadashi Sakairi, Katano, all of Japan

[73] Assignee: Matsushita Electric Industrial Co., Ltd., Osaka, Japan

[21] Appl. No.: 241,040

[22] Filed: Mar. 6, 1981

[30] Foreign Application Priority Data

Mar. 11, 1980 [JP] Japan ................... 55-31198

[51] Int. Cl.³ ............................................ H01H 11/00
[52] U.S. Cl. ...................................... 29/622; 156/299;
200/5 A; 200/67 DA; 200/159 B; 200/340;
264/135; 264/251; 264/254; 264/272.17
[58] Field of Search ............. 29/622; 200/5 A, 159 B,
200/340, 67 DA; 264/135, 251, 254, 272.17,
273; 156/245, 292, 299

[56] References Cited

U.S. PATENT DOCUMENTS

| | | | |
|---|---|---|---|
| 3,890,679 | 6/1975 | Simon .................................. | 264/273 |
| 4,033,030 | 7/1977 | Robinson et al. ...................... | 29/622 |
| 4,057,710 | 11/1977 | Wilmott ........................... | 200/159 B |
| 4,067,102 | 1/1978 | DuRocher et al. ................... | 29/622 |
| 4,131,991 | 1/1979 | Riniker .................................. | 29/622 |
| 4,311,893 | 1/1982 | Tsuchiya et al. ................... | 200/5 A |

FOREIGN PATENT DOCUMENTS 2018024 8/1978 United Kingdom .

Primary Examiner—Carl E. Hall
Assistant Examiner—P. W. Echols
Attorney, Agent, or Firm—Cushman, Darby & Cushman

[57] ABSTRACT

A method of making a keyboard including, a number of switch keys fixedly provided on one surface of a resilient plastic sheet a number of moving contacts formed on the other surface of the resilient plastic sheet. The keys are formed of a plastic material having a melting temperature lower than that of the resilient plastic sheet.

Thermoplastic bond layers are deposited on both surfaces of the resilient plastic sheet. The melting point of the thermoplastic bond layers is lower than that of the switch keys.

The resilient plastic sheet is placed in a metal mold which has cavities (101a) at predetermined places.

Melted plastic material is injected into the cavities to form the switch keys and at the same time cause the portions of thermoplastic bond layers which contact the injected melted plastic to be melted by the heat of the injected melted plastic material and to bond the switch keys onto the resilient plastic sheet.

8 Claims, 7 Drawing Figures

METHOD OF MAKING KEYBOARD SWITCHES

BACKGROUND OF THE INVENTION

1. Field of the Invention

The present invention relates to methods of making keyboard switches for use in pocket type electric calculators or the like.

2. Description of the Prior Arts

Hitherto keyboard switches for use in pocket type electric calculators or the like are formed as shown, for example, in FIG. 1. Switch keys 1 are disposed on one surface of a silicon rubber diaphragm 2. A moving contact 4, made of conductive rubber is fixed on the other surface of diaphram 2, underlying switch key 1. The moving contact 4 is moved downwardly by pressing key 1 and ultimately touches fixed contacts 5, 5' formed on a printed circuit board 3, thereby closing a circuit between the fixed contacts 5, 5'. The printed circuit board 3 has conductors on both surfaces thereof. A frame board 6, having through holes 61, is mounted on the silicon rubber diaphragm 2. Switch keys 1 are held in the through-holes 61. In order to prevent the switch keys 1 from passing out of through holes 61, each switch key has bottom collar 1a at the bottom thereof which engages the underside of associated top collars 62 in frame board 6. In order to assure enough mechanical strength, the bottom collars 1a should have thicknesses of at least 0.5 to 1.0 mm, and therefore, the overall thickness of the keyboard switch can not be drastically reduced. In order to reduce the thickness, it has been proposed, as shown in FIG. 2, to thin the bottom collar 1a by using keys 1 made of stainless steel and forming the thin collar 8b thereof by means of chemical etching. Alternatively, it has been proposed, as shown in FIG. 3, to make having an aluminum body 9 and stainless steel collar 10, about 0.1 mm thick, fixed thereto by calking. However, where a number of switch keys, e.g. fifty, are used in an apparatus, it is inconvenient and expensive to use keys such as shown in FIGS. 2 and 3. Furthermore, a printed circuit board 3 having conductors 5, 5" on both surfaces is rather expensive.

SUMMARY OF THE INVENTION

The present invention provides a novel method of making keyboard switches, which enables efficient formation of the keyboard switches and provides very thin keyboard switches.

DESCRIPTION OF PREFERRED EMBODIMENTS

The present invention provides a method for making a keyboard having a number of switch keys fixedly provided on one surface of a resilient plastic sheet and a number of moving contacts formed on the other surface of said resilient plastic sheet. Specifically, the plastic material used to form the switches is chosen having a melting temperature which is lower than that of the resilient plastic sheet. The method includes the steps of:

(1) coating at least one part of said resilient plastic sheet with a thermoplastic bond layer, the melting point of the thermoplastic bond layer being lower than that of the switch keys, (2) placing the resilient plastic sheet in a metal mold which has cavities to form switch keys at predetermined places, (3) injecting melted plastic material into the mold cavities thereby forming the switch keys and at the same time causing the thermoplastic bond layer at the parts which contact the injected melted plastic to be melted by the heat of said injected melted plastic material and to bond the switch keys onto the resilient plastic sheet.

Figure 4:
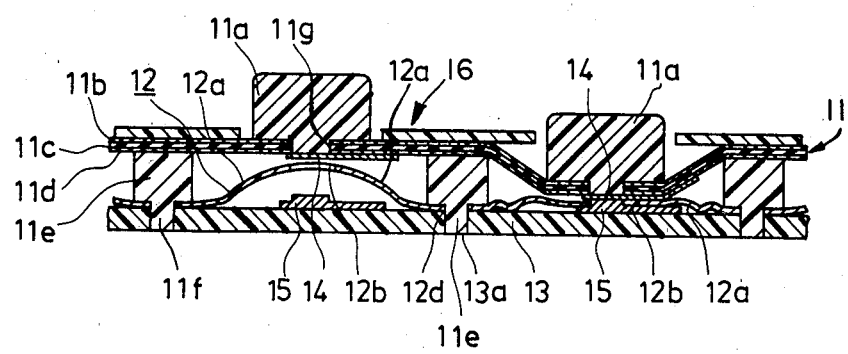
FIG. 4 is a sectional elevation view of a first example of keyboard switches embodying the present invention.

FIG. 4 is a sectional elevation view of a first example of a keyboard switch wherein, as a characteristic part of the present invention, the keyboard switch has a flexible printed circuit sheet 11, which comprises a soft flexible plastic sheet 11c, such as for example a 0.1 mm thick polyester sheet, with coatings of thermoplastic bond layers 11b and 11d. Bond layers 11b and 11d are, for example, 30 μm thick. Switch keys or buttons 11a are bonded on the upper surface of the plastic sheet 11c by means of the upper bond layer 11b, and spacers 11e are bonded on the lower surface of the plastic sheet 11c by means of the lower bond layer 11d. A snap action sheet 12, which biases switch keys 11a upward by a resilient hemispherical convex part 12a, is provided under the plastic sheet 11c. Each convex part 12a includes holes 12b through which contacts (14, 15) touch. The snap action sheet 12 is, for example, made of a polyester insulation sheet having a resiliency by means of a number of hemispherical protrusions 12a formed by vacuum molding at positions corresponding to switch keys 11a. A printed circuit board 13, which has on its upper face a first printed circuit pattern and a fixed contact 15 connected thereto, is provided under the snap action sheet 12. And the snap action sheet 12 is fixedly held between the lower face of the spacer and the printed circuit board 13, which is fixed in an accurate position by pins 11f of spacer 11e. The flexible plastic sheet 11c has a second printed circuit pattern and a moving contact 14 connected thereto on the lower face thereof. The second printed circuit pattern and the moving contact 14 are formed on the flexible plastic sheet using known conductive ink comprising metal powder, such as silver powder, and an adhesive or by means of known sputtering process.

Figure 5:
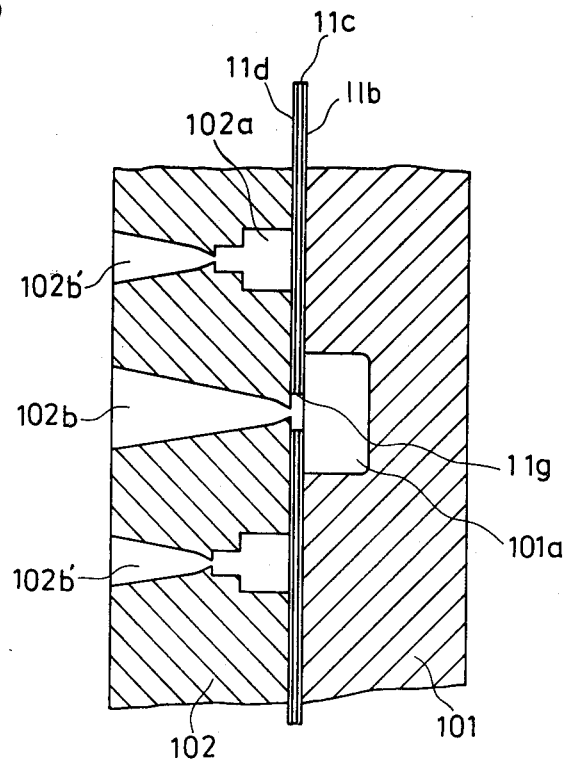
FIG. 5 is a sectional view of a mold for making a principal part of the example of FIG. 4.

The switch keys 11a and the spacers 11e are simultaneously and efficiently formed by means of a specially designed mold shown in FIG. 5, wherein the mold consists of a first block 101 and a second block 102, between which the flexible plastic sheet 11c is placed (together with bonding layers 11b, and 11d). The first mold 101 has cavities 101a for forming switch keys 11a, and the second mold 102 has cavities 102a for forming spacers 11e and injecting gates 102b' connecting thereto. Mold 102 also provides injecting gates 102b connected to the cavities 101a via through-holes 11g of the plastic sheet 11c. The through-holes 11g are formed beforehand, for example by a punching machine linked to an open-and-close mechanism for the mold blocks 101 and 102. After installing the plastic sheet 11c between the mold blocks 101 and 102, a thermoplastic material, for example hot (about 250° C.) melted ABS is injected through the gates 102b and 102b' into cavities 101a and 102a, respectively. Since the injected melted ABS retains a temperature of around 200° C. for a short time, the portions of thermoplastic bond layers 11b and 11d contacting the injected resin in the cavities 101a and 102a are melted and bond the injected switch keys 11a and spacers 11e to flexible plastic sheet 11c. The other parts, that is, the portions of bonding layers 11b and 11d contacting the face of the mold blocks 101 and 102, are not melted. As a result, after cooling down of the molds 101 and 102, (which are retained at a temperature of 60°–80° C.), the integrated flexible plastic sheet 11c, switch keys 11a and spacers 11e are removed from the molds 101, 102. A crystalline polymer type plastic bond, which has a nature of rapid melting over the temperature of about 130° C., is suitable as the material for the bond layers 11b and 11d. By using such a bond, the bond material layers 11b and 11d selectively melt only in the vicinity of cavities 101a and 102a, respectively, wherein the high temperature plastic, (such as melted ABS) is injected, and therefore bond layers 11b and 11d do not melt and adhere to the mold blocks 101 and 102, respectively. By the way, flexible plastic sheet 11c is not melted by the heat of the injected plastic, since the plastic sheet 11c is made of a high melting point plastic such as rigid saturated polyester resin. Then the hardened plastic in the gates 102b and 102b' is cut away. The plastic sheet 11c with the switch keys 11a and spacers 11e is then used in fabricating the keyboard switch of FIG. 4.

When the switch key or button 11a is pressed down as shown by the right side one in FIG. 4, the flexible plastic sheet 11c bends down and hence the snap action sheet 12 is pressed down. When the pressing force on the hemispherical protrusion 12a of the snap action sheet 12 exceeds a certain level, the top part of the protrusion 12a is suddenly inverted downwards, thereby allowing the switch key 11a to descend with a snap action. Hence moving contact 14 touches the fixed contact 15 through the opening 12b of the protrusion 12a to close a switch circuit. The snap action sheet 12 of insulating plastic material serves to prevent undesirable electrical contact between portions of the first printed circuit on the flexible plastic sheet 11c and the second printed circuit on the printed circuit board 13 other than switch contacts 14 and 15.

By forming the snap action sheet 12 using a relatively hard, resilient plastic such as a rigid saturated polyester sheet, a distinct snap action for the switch key operation is obtainable, thereby increasing reliability of the switches. The end tips of the spacers 11e have fixing pins 11f which are to be inserted through fixing holes 12d of the snap action sheet 12 and further into fixing holes 13a of the printed circuit board 13. By such insertions, the position of the snap action sheet is accurately defined with respect to the plastic sheet 11c, i.e., the upper printed circuit having moving contacts 14 and the printed circuit board 13 having the fixed contacts 15 thereon. Therefore, the relative positions of the contacts 14, 15 and the through-holes 12b of the snap action sheet 12 are accurately defined, thereby assuring reliable switching operations.

Figure 1:
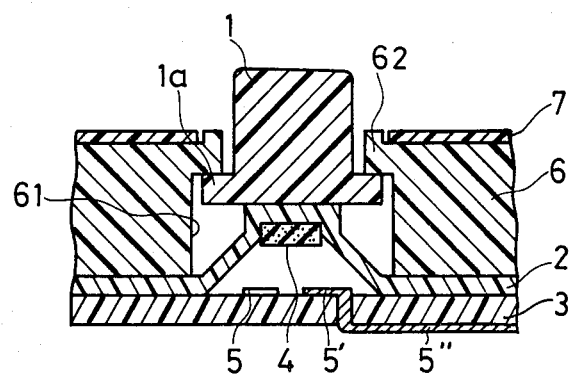
FIG. 1 is a sectional elevation view of a part of conventional keyboard switches.
Figure 2:
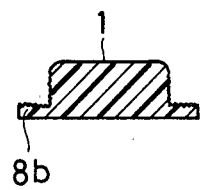
FIG. 2 and FIG. 3 are sectional elevation views of modified examples of switch keys of the conventional keyboard switches.
Figure 3:
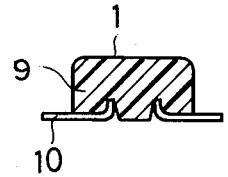

The abovementioned structure and method enable (1) designing very thin keyboard switches because there is no need for collar parts, (2) low manufacturing cost keyboard switches through use of a cheap resilient sheet such as polyester, (3) manufacturing the switch with a smaller number of steps and less skill because a large number of switch keys or buttons 11a are simultaneously fixed on accurate positions at the flexible plastic sheet 11c, and (4) reducing manufacturing cost by use of simple single-face printed circuit board 13 together with the flexible plastic sheet 11c with a printed circuit thereon instead of the hitherto used expensive double-face printed circuit board 3 and silicon rubber sheet 2 with contact 4 as of FIG. 1.

Figure 6:
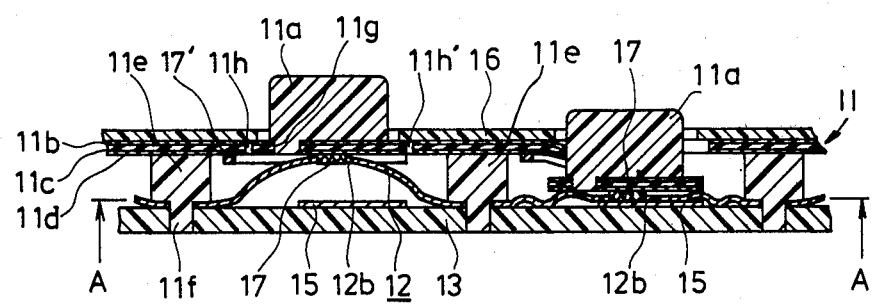
FIG. 6 is a sectional elevation view of a second example of keyboard switches embodying the present invention.
Figure 7:
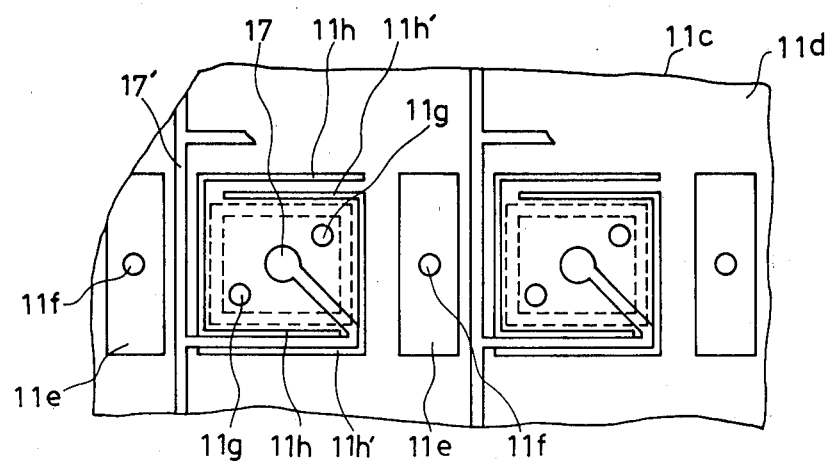
FIG. 7 is a bottom view of a plastic sheet 11 of the example of FIG. 6.

FIG. 6 and FIG. 7 show a second example in accordance with the present invention, wherein FIG. 6 is a sectional elevation view and FIG. 7 is a bottom view of a flexible plastic sheet 11c of FIG. 6. In this example, the parts designated by the same reference numerals corresponds to those of the first example, and hence the same descriptions apply. The flexible plastic sheet 11c, the switch keys 11a and spacers 11e are made in the manner elucidated in the first example referring to FIG. 5. In the embodiment of FIGS. 6 and 7, however the conductor of the moving contact 17 and the printed circuit formed on the lower face of the flexible plastic sheet 11c are formed by a conductive rubber sheet, i.e. a thin rubber sheet containing conductive particles such as carbon black or a stable metal. The conductive rubber sheet 17 is shaped in a circuit pattern as shown in FIG. 7 and bonded by pressing to the bond layer 11c when the latter is heated at a temperature of about 150° C. The bonding of the conductive rubber sheet 17 can be made simultaneously with the injection molding of the switch keys 11a and spacers 11e. Also two U-shaped slits 11h and 11h' are formed on the sheet 11c in a manner to surround the area beneath the switch key 11a. Slit 11h provides greater flexibility compliance for the area bearing the moving contact 17, thereby improving the sharpness of the snap action switch operation.

This second example is more economical in using the conductive rubber sheet 17 instead of silver paint as the printed circuit on the flexible plastic sheet 11c, and manifests a sharp snap action feeling.

What is claimed is:

1. In a method of making a keyboard including a number of switch keys fixedly provided on one surface of a resilient plastic sheet and a number of moving contacts formed on the other surface of said resilient plastic sheet, the improvement wherein
    said switch keys are formed from a plastic material having a melting temperature lower than that of the resilient plastic sheet, and
    the method includes the steps of:
    (1) disposing a thermoplastic bond layer on at least one part of said resilient plastic sheet, the melting point of the thermoplastic bond layer being lower than that of the switch keys,
    (2) placing said resilient plastic sheet in a metal mold including cavities at predetermined positions to form said switch keys,
    (3) injecting melted plastic material into the mold cavities thereby forming said switch keys and at the same time causing the portions of said thermoplastic bond layer in contact with the injected melted plastic to be melted by the heat of the injected melted plastic material and to bond said switch keys onto said resilient plastic sheet.

2. A method in accordance with claim 1 wherein
said metal mold further includes further cavities to form spacers and
the method further includes the steps of
injecting melted plastic material into said further cavities simultaneously with said injecting into the first mentioned cavities, thereby forming spacers and at the same time causing the portions of said thermoplastic bond layer in contact with said injected melted plastic to be melted by the heat of said injected melted plastic material and to bond said spacers onto said resilient plastic sheet,
forming a first printed circuit on the surface of said resilient plastic sheet opposite to the surface to which said switch key is bonded, and
fixing a printed circuit substrate, having a second printed circuit disposed thereon such that the first and the second printed circuits face each other spaced apart by a small gap defined by said spacer.

3. A method in acordance with claim 1 wherein said thermoplastic bond layer is of a bond material having a melting point which is above the temperature of said metal mold and below the melting point of said melted plastic material to be injected into said cavities.

4. A method in accordance with claim 1 wherein the method further includes the steps of
forming a first printed circuit, a part of which serves as a moving contact, and
fixing a printed circuit board having a second printed circuit, a part of which serves as a fixed contact, disposed such that the first and the second printed circuits face each other with a predetermined gap inbetween.

5. A method in accordance with claim 4 which further comprises the step of
fixing a snap action sheet of a resilient insulating plastic sheet between said first printed circuit and said printed circuit board, said snap action sheet having through-holes for allowing selective electrical contact between said moving contact and said fixed contact therethrough.

6. A method in accordance with claim 2, wherein a part of said first printed circuit serves as a moving contact and a part of said second printed circuit serves as a fixed contact.

7. A method in accordance with claim 6 which further comprises the step of
fixing a snap action sheet of a resilient insulating plastic sheet between said first printed circuit and said printed circuit substrate, said snap action sheet having through-holes for allowing contacting of said moving contact and said fixed contact therethrough.

8. A method in accordance with claim 7, wherein said spacers include projecting fixing pins, and said snap action sheet and printed circuit substrate include fixing holes therein, and said method further includes the steps of fixing position of said snap action sheet by insertion of said fixing pins through said fixing holes in said snap action sheet and into said fixing holes in said printed circuit substrate.

* * * * *